(12) United States Patent
Killick

(10) Patent No.: US 10,713,689 B2
(45) Date of Patent: Jul. 14, 2020

(54) PRESENCE-BASED CONTENT RECOMMENDATIONS AND ADVERTISING

(71) Applicant: Cox Communications, Inc., Atlanta, GA (US)

(72) Inventor: Ray Killick, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 1048 days.

(21) Appl. No.: 14/087,329

(22) Filed: Nov. 22, 2013

(65) Prior Publication Data

US 2015/0149294 A1    May 28, 2015

(51) Int. Cl.
*G06Q 30/00* (2012.01)
*G06Q 30/02* (2012.01)

(52) U.S. Cl.
CPC ................................ *G06Q 30/0269* (2013.01)

(58) Field of Classification Search
None
See application file for complete search history.

(56) References Cited

U.S. PATENT DOCUMENTS

| | | | |
|---|---|---|---|
| 2013/0019262 A1* | 1/2013 | Bhatia | H04N 21/252 725/34 |
| 2015/0120408 A1* | 4/2015 | Liu | H04W 4/021 705/14.12 |
| 2019/0289354 A1* | 9/2019 | Garcia | H04N 21/4344 |

* cited by examiner

*Primary Examiner* — Alvin L Brown
(74) *Attorney, Agent, or Firm* — Eversheds Sutherland (US) LLP

(57) ABSTRACT

Systems and methods for providing content recommendations or advertisements based at least in part on the identity of users that are within an experiential range of a primary device for rendering the content recommendation or advertisement are disclosed. A home service gateway may be configured to identify users within the experiential range of the primary device and generate a content recommendation request and/or an advertisement request identifying the users within the experiential range. A content delivery system may receive the recommendation request and/or ad request and provide content recommendations and/or advertisements to the home service gateway based at least in part on the identity of the users that are within the experiential range of the primary device.

13 Claims, 10 Drawing Sheets

PRESENCE-BASED CONTENT RECOMMENDATIONS AND ADVERTISING

TECHNICAL FIELD

This disclosure generally relates to presence-based content recommendations and advertising.

BACKGROUND

Content providers, such as broadcasters and multi-service operators (MSO), may insert advertising before, during, and/or after programming content. These ads are generally purchased by ad buyers and are not dynamically selected based on the viewers of the ads. Content providers may also provide suggestions to subscribers of content that may be available for rendering. These content recommendations may be provided based on what content is available for rendering to the subscribers.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Example embodiments of the disclosure may provide systems, apparatuses, and methods for providing content recommendations and/or rendering advertisements (ad) based at least in part on the presence of users and/or viewers of content and/or ads rendered. In other words, content recommendations and/or suggestions may be generated by first detecting and/or identifying individuals that may be in proximity of user interface(s) on which the content is to be rendered. For example, users that are in proximity of viewing screen, such as a television, may be detected and this presence information of the users may be used in generating content viewing recommendations. Similarly, the presence information of the users may be used to select ads to present to the collection of users. The selection of ads, therefore, may be made using a variety of factors and based at least in part on the users that are within a location where the user may experience the ad as rendered. In example embodiments of the disclosure, the presence of users may be detected by detecting the presence of a user device associated with particular users. Therefore, if a particular user device associated with a particular user is detected within a region where the user may be able to experience content and/or an ad, then it may be determined that content recommendations and/or ads should be suited, at least in part, to the detected user by his/her user device. In certain example embodiments, metrics, such as viewership metrics and/or ad interaction metrics may be collected, based at least in part on the presence of the users and/or actions of the user. These metrics may be stored and/or used for a variety of purposes, such as determination of fulfilling the terms of an ad campaign, billing and/or providing payment to entities associated with content and/or advertising, and/or provide improved future content and/or ad targeting.

Figure 1:
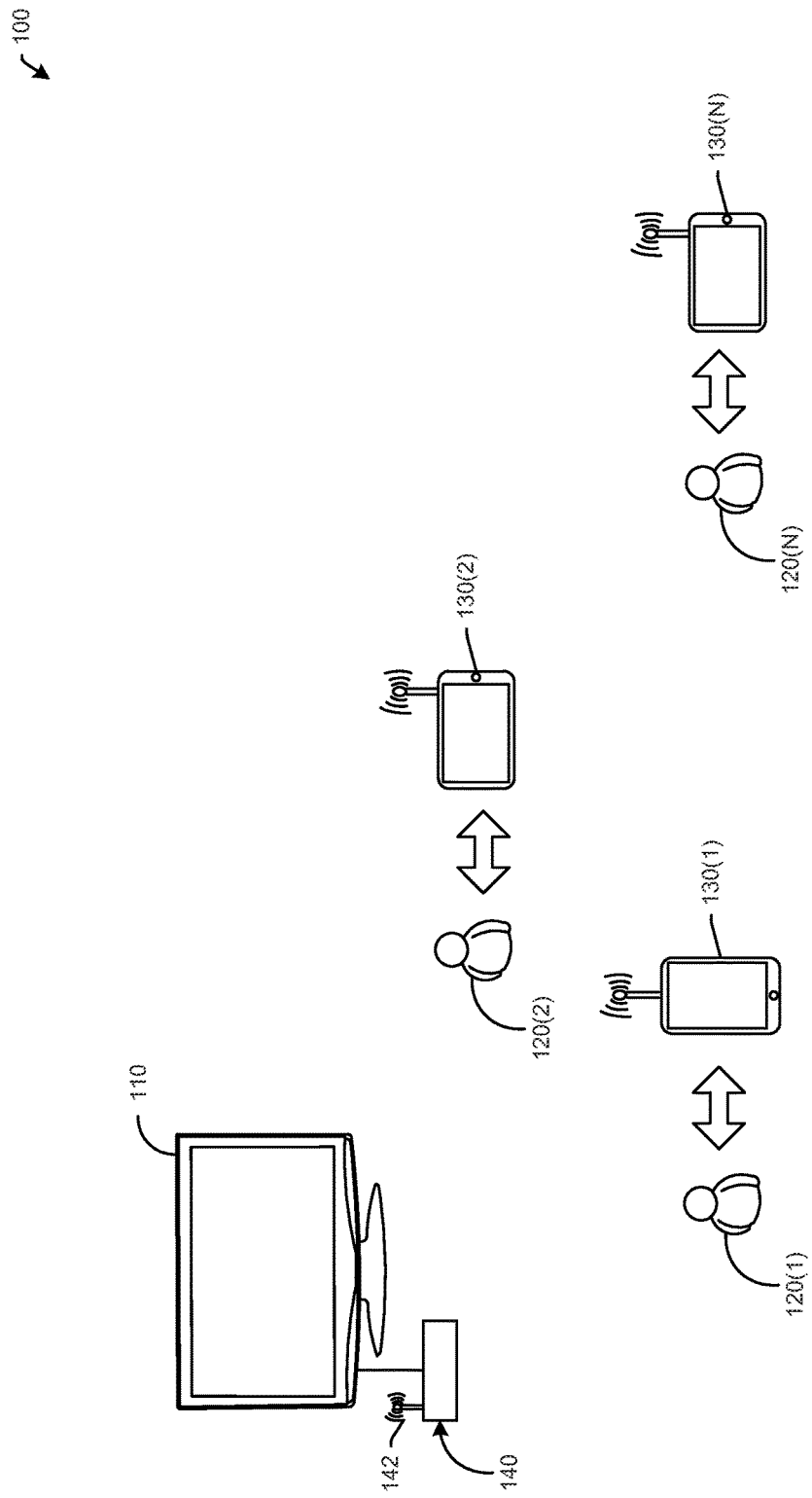
FIG. 1 is a simplified schematic diagram illustrating an environment where a home service gateway is configured to detect users that are in range of experiencing rendered content and/or advertising, in accordance with example embodiments of the disclosure.

Referring now to FIG. 1, the implementation of example embodiments of detecting presence of users in proximity of an interface for rendering content and/or ads is discussed. FIG. 1 is a simplified schematic diagram illustrating an environment 100 where a home service gateway (HSG) 140 is configured to detect users that are in range of experiencing rendered content and/or ads, in accordance with example embodiments of the disclosure. The environment 100 may include a primary content and/or ad rendering device 110, hereinafter referred to as primary device 110, communicatively coupled to the HSG 140. Although the primary device 110 is shown in the form of a television, it will be appreciated that the primary device 110 may be any device suitable for rendering content, including, but not limited to, a television, a display screen, a speaker, a haptic output, a smart phone, a tablet computing device, a notebook computer, a netbook computer, an ebook reader, combinations thereof, or the like. The primary device 110 may be configured to receive one or more signals, such as a variety of audio/video signals, from the HSG 140 for the purposes of rendering content and/or ads.

The HSG 140 may be configured to interact with the primary device 110 to provide the primary device 110 with content and/or ads, or signals associated therewith, for the purposes of rendering content and/or ads on the primary device 110. The HSG 140, while depicted as a set-top box (STB), may be any suitable multimedia home service gateway including, but not limited to a digital video recorder (DVR), an internet protocol television (IPTV) device, a web-enabled television, an integrated television and STB, a video game console, a device suited for receiving streaming media content, combinations thereof, or the like. The HSG 140 may further include one or more antennas 142 for receiving one or more wireless signals from other electronic, wireless, and/or communications devices. The HSG 140 may further be configured to determine the presence of one or more electronic, wireless, and/or communications devices based at least in part on wireless signals received via the one or more antennas 142.

The antennas 142 may be any suitable type of antenna corresponding to the communications protocols used by the HSG 140. Some non-limiting examples of suitable protocols and/or antenna 142 types include Bluetooth Low Energy (BLE), Bluetooth, Long Term Evolution (LTE), third generation (3G), fourth generation (4G), Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The antenna 142 may be coupled to a radio to transmit and/or receive wireless communications signals to/from the antenna 142. The environment 100 may further include one or more users 120(1), 120(2), . . . , 120(N), hereinafter referred to individually or collectively as users 120. Some, all, or none of the users 120 may be within spatial range of the primary device 110 to experience content and/or ads that may be rendered by the primary device 110. For example, as depicted, the user 120(N) may not be within viewing and/or hearing range of the primary device 110, while users 120(1) and 120(2) may be within viewing and/or hearing range of the primary device 110. In certain example embodiments, the one or more users 120 may be affiliated with each other. For example, the one or more users 120 may be family members and/or friends. In another example, the one or more users may be in the same sports bar with multiple primary devices 110 and corresponding HSGs 140.

Each of the users may further have one or more corresponding user devices 130(1), 130(2), . . . , 130(N), hereinafter referred to individually or collectively as user devices 130. Each user device may be associated with a particular corresponding user 120. In some example cases, more than one user 120 may be associated with a single user device 130 or a group of user devices 130. In other example cases, a particular user 120 may have more than one user device 130 associated with him/her. The user device 130 and one or more processors (e.g. computer processors) thereon (not shown) may further be configured to communicate wireless signals to and/or from the HSG 140. One or more software and/or programs may be executed on the user device 130 to enable the user device functionality as described herein. The user devices 130 may be any suitable device used by the corresponding respective user 120 and configured to communicate with the HSG 140 including, but not limited to tablet computing devices, electronic book (ebook) readers, netbook computers, notebook computers, laptop computers, desktop computers, server systems, personal digital assistants (PDA), smart phones, combinations thereof, or the like.

The user devices 130 may be configured to transmit one or more wireless signals that may be received and/or interpreted by the HSG 140. The transmitted wireless signal may, in certain example embodiments, be transmitted by an antenna disposed on the user device 130 within a relatively limited range, such as within a few meters of the user device 130. The user device 130 may be configured to transmit signals of a variety of standards including, but not limited to, Bluetooth Low Energy (BLE), Bluetooth, Long Term Evolution (LTE), third generation (3G), fourth generation (4G), Wi-Fi antennas, and IEEE 802.11 family of standards. The transmitted wireless signal may carry an indication of the identity of the user device 130 and/or the identity, such as a protected identity, of the user 120. In the same or other example embodiments, the transmitted wireless signal may carry information that may be used to determine the distance and/or the relative location of the transmitting user device 130 from where the signal is received, such as at the HSG 140. For example, the wireless signal may carry, in some cases, best-known location information, such as location information that may be ascertained by the user device 130 from global navigation satellite system (GNSS) signals, inertial sensors, Wi-Fi access point signals, or the like. In certain example embodiments, the user devices 130 may be configured to provide an indication, such as an indication carried by a transmitted wireless signal, of the corresponding user's interaction with the user device 130. For example, the user device 130 may be configured to indicate if the user is engaged with and/or viewing items on the user device 130.

In further example embodiments, the user device 130 and processors thereon may be configured to provide indications, such as by information carried on transmitted signals, of the corresponding user's engagement with the user device 130 and/or the primary device 110. For example, the user device 130 may be configured to provide an indication of the direction in which the corresponding user 120 is looking based at least in part on signals from a camera, such as an image sensor. As another non-limiting example, the user device 130 may be configured to provide an indication of whether the corresponding user 120 and/or which corresponding user 120 may be interacting with the user device 130, such as by performing facial recognition or other biometric analysis on sensor signals, such as camera signals. Further still, the user device 130 may be configured to provide an indication of whether a user 120 is interacting with the user device 130, based on a variety of sensor information, such as inertial sensors (e.g. accelerometers), that may provide an indication of movement indicative of user interaction with the user device 130.

In the environment 100, in certain example embodiments, the HSG 140 may be configured to determine the presence, such as within a spatial location where content and/or ads rendered on the primary device 110 may be experienced, of one or more users 120 based at least in part on signals received via the antenna 142 from the one or more user devices 130. For example, in the depiction of FIG. 1, the HSG 140 may receive a BLE signal from user devices 130(1), 130(2), but not user device 130(N). Based on the received signals at the HSG 140, the HSG 140 may be configured to determine that users 120(1), 120(2), corresponding to user devices 130(1), 130(2), respectively, may be within the spatial experiential range of the primary device 110.

In further example embodiments, the signal(s) received from user devices 130 may carry one or more information, such as sensor signals generated at the user device 130 that may enable the HSG 140 in determining whether a particular user 120 is within range of experiencing content and/or ads rendered on the primary device 110. For example, indications of location received from the user device 130 may provide an indication of the relative location of the user device and the corresponding user 120. The signals received by the HSG 140 from the user devices 130 may further indicate if it is, indeed, the corresponding respective user 120 that is interacting with the user devices 130. For example, inertial sensor (e.g. accelerometer) signals may indicate if the corresponding respective user is in interaction with his/her user device 130 or if the user device is merely positioned within the interaction zone of the primary device 110, without necessarily having the corresponding respective user 120 within the interaction zone.

Furthermore, the HSG 140 may be configured to determine, based at least in part on the received signals from user devices 130(1), 130(2), if the users 120(1), 120(2), are engaged with their respective user devices, 130(1), 130(2) and/or the primary device 110. In certain example embodiments, the HSG 140 may ascertain if the users 120(1), 120(2) are engaged with the primary device 110 (i.e. viewing, listening to, interacting with) and/or ascertain the likelihood or probability that the users 120(1), 120(2) are engaging with the primary device 110. In further example embodiments, the HSG 140 may be configured to ascertain user engagement with the primary device 110 and or the user device 130 based at least in part on various sensor outputs from the user devices 130. For example, one or more cameras of the user device 130 may provide an indication of whether the corresponding user 120 may be viewing the screen of the user device 130, and are, therefore, engaged with the user device 130. The HSG 140 may be configured to determine metrics associated with interaction of content, such as secondary content provided to the user devices 130, based at least in part on the aforementioned sensor signals that may be communicated from the user devices 130 to the HSG 140.

The HSG 140 may be further configured to request and/or receive content recommendations based at least in part on the detected presence of users 120 within the spatial range/zone where they can experience content and/or ads rendered on the primary device 110. The HSG 140 may be configured to receive an indication from one of the users 120 of a request for content recommendations, such as via one or more user interfaces (e.g. remote control). Alternatively, the HSG 140 may be configured to identify that it is to provide content recommendations upon and/or relatively near the completion of a current content being rendered on the primary device 110 via the HSG 140. The HSG 140 may yet further be configured to request and/or receive ads based at least in part on the detected presence of users 120 within the spatial range/zone where they can experience content and/or ads rendered on the primary device 110. The HSG 140 may be able to determine that there is an ad avail, or a slot where an ad is to be inserted, for rendering an ad on the primary device 110. The HSG 140 may have access to an ad listing and/or ad map of the current content being rendered on the primary device 110 via the HSG 140 from which the HSG 140 may identify imminent ad avails.

Figure 2:
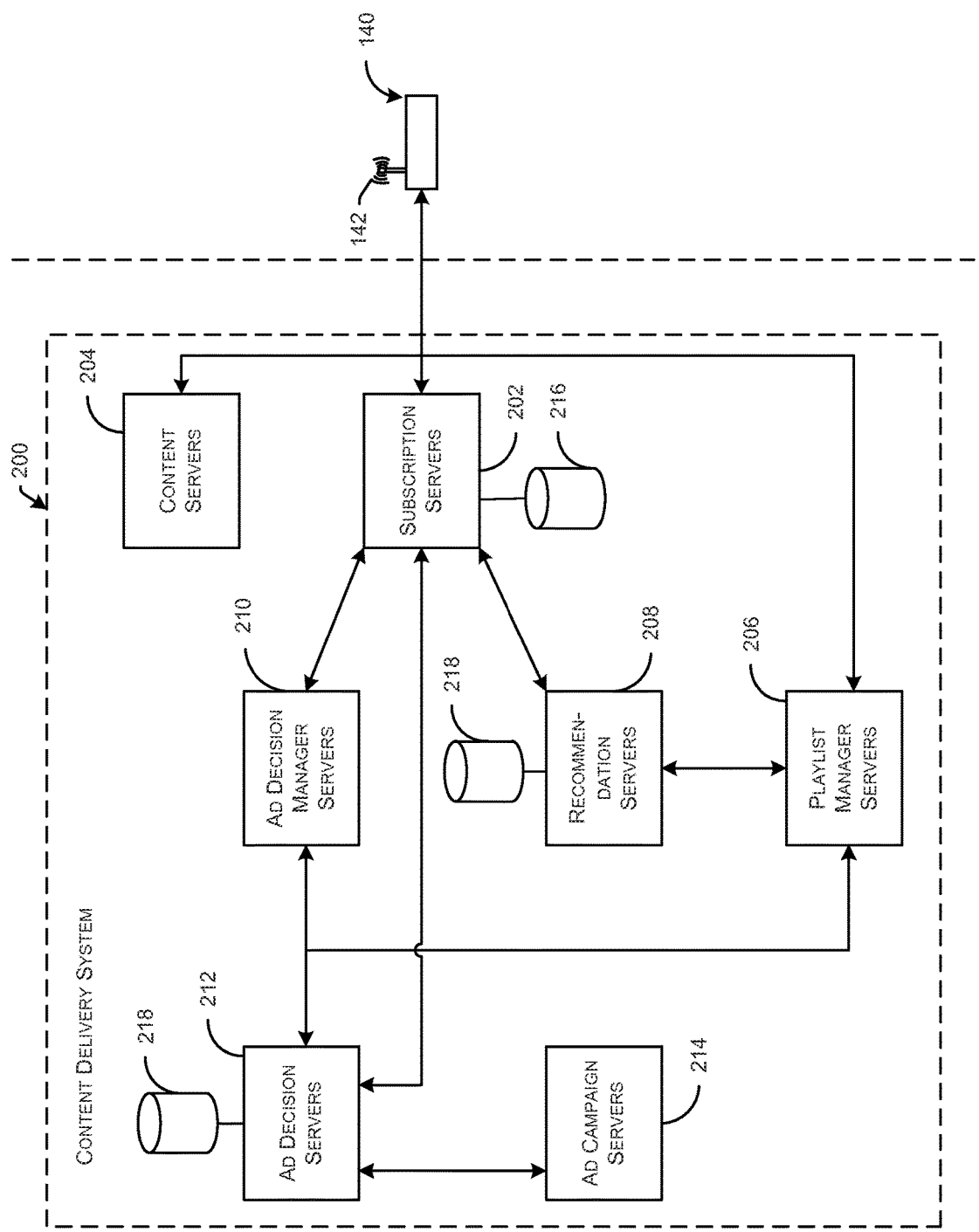
FIG. 2 is a simplified schematic diagram illustrating a content delivery system configured to provide user presence-based content recommendations and advertising, in accordance with example embodiments of the disclosure.

The systems and methods for receiving and/or transmitting content recommendations and/or ads will now be described with reference to FIG. 2 with continuing reference to FIG. 1. FIG. 2 is a simplified schematic diagram illustrating a content delivery system 200 configured to provide user presence-based content recommendations and ads, in accordance with example embodiments of the disclosure. In example embodiments, the content delivery system 200 may be located remotely from the HSG 140. The content delivery network 200 may, for example, be infrastructure associated with a cable content/television provider that is remote to a home or business where the HSG 140 may be located. The content delivery system 200 may include one or more subscription servers 202, one or more content servers 204, one or more playlist manager servers 206, one or more recommendation servers 208, one or more ad decision manager servers 210, one or more ad decision servers 212, and one or more ad campaign servers 214. Although the individual components 202, 204, 206, 208, 210, 212, 214 of the content delivery system 200 are described herein in particular embodiments, it will be appreciated that, in other example embodiments, any of the individual components 202, 204, 206, 208, 210, 212, 214, may be combined with and/or substituted with any of the other components 202, 204, 206, 208, 210, 212, 214. Further still, according to example embodiments of the disclosure, any of the individual components 202, 204, 206, 208, 210, 212, 214 of the content delivery system 200 may be partitioned into further subcomponents, such as distributed processing and/or computing components. Similarly, the processes performed by any of the components 202, 204, 206, 208, 210, 212, 214, as described in example embodiments herein, may, in other example embodiments, be performed in cooperation with the other of the components 202, 204, 206, 208, 210, 212, 214 or by a different component 202, 204, 206, 208, 210, 212, 214, in its entirety. In example embodiments of the disclosure, the individual components 202, 204, 206, 208, 210, 212, 214 of the content delivery system 200 may be communicatively coupled with each other.

The HSG 140 may be configured to provide an indication of the users in the experiential region of the primary device 110. The HSG 140 may be enabled to generate a message indicating the identity, such as a protected identity, of users in the experiential region of the primary device 110 and transmit the message to the subscription servers 202 of the content delivery system 200. Protected identity, as used herein, may generally include a mechanism to determine a user's preferences, demographics, and/or historical behavior while not knowing certain personal information associated with the user that is to be protected. In other words, some parameters of the user 120 may be known, without knowing other identifiers associated with the user 120. For example, in using a protected identity and/or identifier, the user's name, social security number, address, and/or other sensitive identifiers may be protected, while still enabling an abstract identification of the user 120 for purposes of tracking and/or accessing non-sensitive and/or less-sensitive user information associated with the user 120. In example cases, an identifier may be assigned to a particular user 120 and/or his/her user device 130 for the purposes of identifying information associated with that user in a protected manner. Throughout this disclosure, it will be appreciated that a reference to user identity may, in example embodiments, be a reference to a protected identity.

The HSG 140 may further be configured to periodically update the user presence information at the subscription servers 202. The HSG 140 may be configured to communicate with the subscription servers 202 via one or more networks that may include any one or a combination of different types of suitable communications networks, such as cable networks, the Internet, wireless networks, cellular networks, and other private and/or public networks. Furthermore the networks may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. The messages indicating user presence information may be in the form of one or more data packets that may be transmitted by the one or more networks communicatively coupling the HSG 140 and the subscription servers 202. The message indicating user presence may further include identifying information associated with the HSG 140, an identification of a subscription user 120, an identification of the primary device 110, an identification of any one of the user devices 130, any other suitable identifying information, or combinations thereof.

The HSG 140, when it detects an opportunity to provide users 120 with content recommendations, may further be configured to generate a content recommendation request. The content recommendation request may include an indication of the users 120 that are within range of experiencing content on the primary device 110. The HSG 140 may be configured to transmit the content recommendation request, such as in the form of one or more data packets via the one or more networks, to the subscription servers 202 of the content delivery system 200.

The HSG 140 may be configured to receive, responsive to the content recommendation request, recommendations for content from the content delivery system 200. These content recommendations may be received from the playlist manager servers 206 and/or the recommendation servers 208. The content recommendations received may, at least partially, be suited for and/or tailored to the users 120 that were reported by the HSG 140 to be within the experiential range of the primary device 110 in the content recommendation request. The content recommendation may be an indicator of recommended content, or a link thereto, for the users 120 in the relative presence of the primary device 110, as determined by the presence of the users' corresponding user devices 130. The HSG 140 may further be configured to render the recommendations of the content on the primary device 110 by communicating signals, such as audio and/or video signals, with the primary device 110.

Responsive to identifying a relatively imminent ad avail, such as based upon an ad listing of the current content, the HSG 140 may generate an ad request. The ad request may include an indication of the users 120 that are within range of experiencing content on the primary device 110. The HSG 140 may be configured to transmit the ad request, such as in the form of one or more data packets via the one or more networks, to the subscription servers 202 of the content delivery system 200.

The HSG 140 may be configured to receive, responsive to the ad request, ads, or links thereto, from the content delivery system 200. The indication of these ads may be received from the playlist manager servers 206, ad decision servers 212, and/or the ad decision manager servers 210. In example embodiments, the HSG 140 may be configured to receive an updated playlist or manifest file, from the playlist manager servers 206, that include pointers and/or addresses to locations, such as locations of the content servers 204, where ads and/or segments thereof that may be retrieved and/or received. In other example embodiments, the ad may be received directly from the content delivery system in any suitable format, such as streaming video segments, from the content delivery system 200 for insertion by the HSG 140 into the imminent ad avail. The ads received and/or indications thereof in an updated playlist may, at least partially, be suited for and/or tailored to the users 120 that were reported by the HSG 140 to be within the experiential range of the primary device 110 in the content recommendation request. The ad may be targeted to a particular user 120 (e.g. the user with household purchasing responsibility) or the collection of users 120 in the relative presence of the primary device 110, as determined by the presence of the users' corresponding user devices 130. The HSG 140 may further be configured to render the ad on the primary device 110 by communicating signals, such as audio and/or video signals, with the primary device 110. In other words, the HSG may obtain (e.g. retrieve based on a playlist) the ad, such as from the content servers 204, to render onto the primary device 110.

In certain further example embodiments, the HSG 140 may be configured to receive one or more secondary content along with the ad and or updated playlist associated with the ad for insertion in the upcoming ad avail. The HSG 140 may be configured to communicate the one or more secondary content to the one or more user devices 130, such as via the wireless communicative coupling therebetween. The secondary content may be, in some cases related to the ad that has been selected for rendering to the users 120 within the experiential zone of the primary device 110. In one example, the secondary content may be another ad associated with the product or service that is associated with the ad to be rendered on the primary device 110. In another example, the secondary content may be a link to a website associated with the product or service that is associated with the ad to be rendered on the primary device 110. In yet another example, the secondary content may be an interactive game associated with the product or service that is associated with the ad to be rendered on the primary device 110. In some case, different secondary content may be targeted for each of the users 120 in the experiential range of the primary device 110. In other cases, groups of or all of the users 120 in the experiential range of the primary device 110 may be targeted with the same secondary content.

The subscription servers 202 and processors, such as computer processors (not shown) thereon, may be configured to receive a variety of messages and/or requests from the HSG 140. In certain example embodiments, the subscription servers 202 may be configured to receive message(s) indicating the presence of users 120 within the experiential range of the primary device 110. Upon receiving the information associated with the presence of users 120 within the experiential range of the primary device 110, the subscription servers 202 may update a database 216 and/or registry with the presence information. This presence database 216 may be accessed by other components 204, 206, 208, 210, 212, 214 of the content delivery system 200 and/or may be accessed by the subscription servers 202 to communicate information to the other components 204, 206, 208, 210, 212, 214 of the content delivery system 200.

The subscription servers 202 may further be configured to receive a content recommendation request, such as from the HSG 140. The content recommendation request may include information pertaining to users within the experiential range of the primary device 110 and the subscription servers 202 and the processors thereon may be configured to identify those users and update the presence database 216 with the presence information. The subscription servers may further be configured to transmit the content recommendation request, or an indication thereof, to the recommendation servers 208.

The recommendation servers 208 may be configured to receive a content recommendation request as received directly from the HSG 140 or via one or more intermediaries, such as the subscription servers 202. Upon receiving the content recommendation request, the recommendation servers 208 may be configured to determine the users 120 associated with the content recommendation. In other words, the recommendation servers 208 may be able to identify those users 120 that are within the experiential range of the primary device 110 for whom the content recommendation is to be provided. The users associated with the content recommendation request may, in certain example embodiments, be ascertained by the content recommendation request received by the recommendation servers 208. In other example embodiments, the recommendation servers 208 may determine the user presence information associated with the content recommendation request by accessing the presence database 216 or requesting and/or receiving the presence information associated with the content recommendation request from the subscription servers 202.

Upon identifying the users 120 associated with the content recommendation request, the recommendation servers may be configured to access a user preference database 218 that may store information associated with the preferences, demographics, and/or historical behavior of a variety of users 120. The demographical information associated with a particular user 120 may include, for example, number of people in the user's household, gender of the user, age of the user, race of the user, religion of the user, sexual orientation of the user, political views of the user, product or service preferences of the user, combinations thereof, or the like. The preference information associated with a particular user 120 may include, for example, what products or services the user likes or dislikes. The historical behavior information associated with a particular user 120 may include, for example, previous products or services purchased by the user, websites visited by the user, content requested by the user, ads that the user has viewed, ads with which the user has interacted, combinations thereof, or the like. The recommendation servers 208 may be configured to access the preference, demographic, and/or historical behavior information of all or at least some of the users 120 that are in the experiential range of the primary device 110 associated with the recommendation request. The recommendation servers 208 may further be configured to determine one or more content recommendations based at least in part on the preference, demographic, and/or historical behavior associated with one or more of the users 120 identified to be within the experiential range of the primary device 110. The recommendation servers 208 may be configured to provide the determined one or more content recommendations to the HSG 140 via one or more other entities, such as, for example, the playlist manager servers 206 and/or the subscription servers 202.

The subscription servers 202 may further be configured to receive an ad request, such as from the HSG 140. The ad request may include information pertaining to users within the experiential range of the primary device 110 and the subscription servers 202 and the processors thereon may be configured to identify those users and update the presence database 216 with the presence information. The subscription servers 202 may further be configured to transmit the ad request, or an indication thereof, to the ad decision manager servers 210. The ad request from the HSG 140, as discussed above, may be based at least in part on identifying an ad avail within the content being rendered by the HSG 140 via the primary device 110.

The ad decision manager servers 210 may be configured to receive the ad request and/or indication thereof from either the subscription servers 202 or, in certain example embodiments, the HSG 140 directly. In some example cases, the ad decision manager servers 210 may not receive an ad request, such as from the HSG 140, but instead recognize that an ad is to be delivered to the HSG 140 based on an ad listing associated with content being rendered by the HSG 140 on the primary device 110. The ad decision manager servers 210, when an ad is required and/or requested by the HSG 140, may generate a second ad request that includes the identity of the users 120 within the experiential range of the primary device 110. This second ad request may be transmitted by the ad decision manager servers 210 to the ad decision servers 212. Generating the second ad request by the ad decision manager servers 210 may entail, in certain example embodiments, requesting and/or receiving identity of user 120 within the experiential range of the primary device 110 from the subscription servers 202 and/or the presence database 216.

The ad decision servers 212 may, in certain example embodiments, receive the second ad request from the ad decision manager servers 210. In alternative embodiments, the ad decision servers 212 may receive an ad request directly from the HSG 140 or the subscription servers 202. The ad decision servers 212 may further be configured, in accordance with example embodiments of the disclosure, to identify the users 120 that are within the experiential range of the primary device 110 based at least in part on the received ad request. The ad decision servers 212 may yet further be configured to access the user preference database 218 to retrieve information associated with the preferences, demographics, and/or historical behavior of one or more of the users 120 within the experiential zone of the primary device 110, as indicated in the received ad request. The ad decision servers 212 may still further be configured to receive information pertaining to ad campaigns that are being run and/or ads that are available for providing and/or rendering to users 120. The ad campaign and/or available ad information may be retrieved and/or received from the ad campaign servers 214. Based at least in part on the preferences, demographics, and/or historical behavior of one or more of the users 120 within the experiential zone of the primary device 110, the ad decision servers 212 may be configured to select an ad to be rendered on the primary device 110 to the users 120 within the experiential region of the primary device 110. The ad decision servers, in some further example embodiments, may be enabled to select one or more secondary content to be displayed to the users 120 within the experiential region of the primary device 110 on their respective user devices 130, in addition to the selected ad to be rendered on the primary device 110. The selected ad, and, optionally the one or more second content, or indications thereof, may be communicated by the ad decision servers 212 to the playlist manager servers 206 to be incorporated into updated playlists to be transmitted to the HSG 140 to enable the HSG 140 to receive the selected ad and/or one or more second content, such as from the content servers 204.

Figure 3:
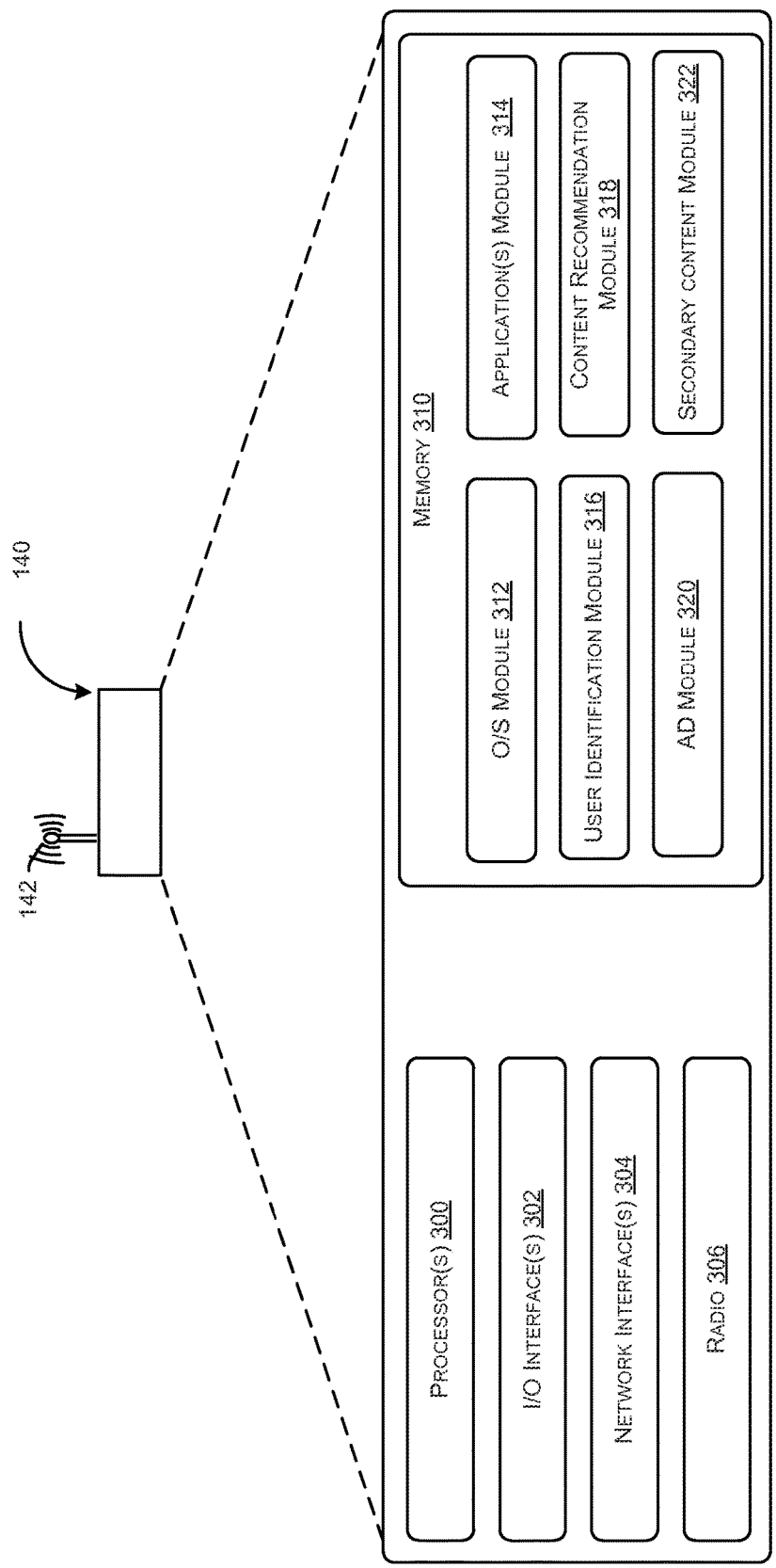
FIG. 3 is a simplified block diagram illustrating an example home service gateway, in accordance with example embodiments of the disclosure.

The architecture of the HSG 140 may be better understood with reference to FIG. 3. FIG. 3 is a simplified block diagram illustrating an example home service gateway (HSG) 140, in accordance with example embodiments of the disclosure. The HSG 140 may include one or more processors 300, one or more input/output (I/O) interfaces 302, one or more network interfaces 304, one or more radios or transceivers 306, and one or more memories 310.

The processors 300 of the HSG 140 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processors 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The HSG 140 may also include a chipset (not shown) for controlling communications between one or more processors 300 and one or more of the other components of the HSG 140. The processors 300 may also include one or more application specific integrated circuits (ASICs) or application specific standard products (ASSPs) for handling specific data processing functions or tasks.

The one or more I/O device interfaces 302 may enable the use of one or more (I/O) device(s) or user interface(s), such as remote control entry of information, keyboard and/or mouse. A user 120 may be able to interact with the systems and methods disclosed herein by interacting with HSG 140 via the I/O device interfaces 302. The network interfaces(s) 304 may allow the ad broker interconnect system 210 also referred to as "ad decision manager servers" to communicate via the one or more network(s) and/or via other suitable communicative channels. In example embodiments, the network interfaces 304 may enable the HSG 140 to communicate with the content delivery system 200 via one or more networks, such as the Internet.

The transmit/receive or radio 306 may include any suitable radio for transmitting and/or receiving radio frequency (RF) signals in the bandwidth and/or channels corresponding to the communications protocols utilized by the HSG 140 to communicate with the user devices 130 and/or other communications infrastructure. The radio component 306 may include hardware and/or software to modulate communications signals according to pre-established transmission protocols. The radio component 306 may be configured to generate communications signals for one or more communications protocols including, but not limited to, Bluetooth Low Energy (BLE), Bluetooth, Long Term Evolution (LTE), third generation (3G), fourth generation (4G), Wi-Fi antennas, IEEE 802.11 family of standards, or combinations thereof. In certain example embodiments, protocols may be used for communications between relatively adjacent user device 130, such as via BLE, dedicated short-range communication (DSRC), or other packetized radio communications. The radio component 306 may include any known receiver and baseband suitable for communicating via the communications protocols of the user device 130. The radio component may further include a low noise amplifier (LNA), additional signal amplifiers, an analog-to-digital (A/D) converter, one or more buffers, and digital baseband.

The memory 310 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. Turning to the contents of the memory 310 in more detail, the memory 310 may include one or more operating systems (O/S) module 312, an applications module 314, user identification module 316, a content recommendation module 318, an ad module 320, and a secondary content module 322. Each of the modules and/or software may provide functionality for the HSG 140, when executed by the processors 300. The modules and/or the software may or may not correspond to physical locations and/or addresses in memory 310. In other words, the contents of each of the modules 312, 314, 316, 318, 320, 322 may not be segregated from each other and may, in fact be stored in at least partially interleaved positions on the memory 310.

The O/S module 312 may have one or more operating systems stored thereon. The processors 300 may be configured to access and execute one or more operating systems stored in the (O/S) module 312 to operate the system functions of the ad broker interconnect system 210. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more functionality associated with the aggregation of ad assets into ad demographic bins, sales of demographic bins, and procurement of ad assets to fulfill the terms of the sold ad demographic bins. These instructions and/or applications may, in certain aspects, interact with the (O/S) module 312 and/or other modules of the ad broker interconnect system 210. The applications module 314 may have instructions, software, and/or code stored thereon that may be launched and/or executed by the processors 300 to execute one or more applications and functionality associated therewith. These applications may include, but are not limited to, functionality such as web browsing, audio/video rendering, image processing, business, communications, graphics, word processing, publishing, spreadsheets, databases, gaming, education, entertainment, media, project planning, engineering, drawing, or combinations thereof.

The user identification module 316 may have instructions stored thereon that, when executed by the processors 300, enable the HSG 140, to perform various functions related to identifying users 120 within the experiential range of the primary device 110. The processors 300, based on received wireless signals, such as Bluetooth Low Energy (BLE) signals, may be configured to identify user devices 130 from which the wireless signal is received. The wireless signals from the user devices 130 may have a limited range and the limited range may correspond to a range where content and/or ads rendered on the primary device 110 can be experienced. Therefore, the processors 300 simply by detecting a wireless signal, in certain example embodiments, may be able to ascertain that the corresponding user device 130 and the respective user 120 is within the experiential range of the primary device 110. In other example embodiments, the received wireless signal may include position information of the wireless signal transmitting user device 130 and the processors 300 may be configured to ascertain if the that user device 130 and the respective user 120 are within the experiential range of the primary device 110 based thereon. The processors 300 may be further configured to associate and thereby identify the users 120 associated with the identified user devices 130. The user association may be based at least in part on a table, such as a look up table or association table stored on the memory 310, of associations between user device identifiers and respective users. The wireless signals received by the HSG 140, such as via antenna 142, may carry user device identifier information. The processors 300 may further be configured to report the identity of the users 120 detected by wireless signals received at the HSG 140 to various entities of the content delivery system 200, such as the subscription servers 202.

The content recommendation module 318 may have instructions stored thereon that, when executed by the processors 300, enable the HSG 140, to perform various functions related to provide content recommendation. In example embodiments of the disclosure, the content recommendations provided by the HSG 140 may be based at least in part on identified users 120 within the experiential range of the primary device 110. The processors 300 may be configured to generate a content recommendation request and transmit the content recommendation request to components of the content delivery system 200, such as the subscription servers 202. The content generation request may include the identity of the users 120 that may be within the experiential range of the primary device 110. The processors 300 may further be configured to receive a content recommendation responsive to the transmitted content recommendation request. The content recommendation may include one or more content that may be of interest to the users 120 within the experiential range of the primary device 110. In some cases, the content recommendations may be selected if they are of interest to all of the users 120 within the experiential range of the primary device 110. In other cases, the content recommendations may be based on a weighting of the preferences of the users 120 within the experiential range of the primary device 110. In yet other cases, the content recommendations may be based on the preferences of a subset of the users 120 within the experiential range of the primary device 110. Once the content recommendations are received by the HSG 140, the HSG 140 may be configured to render and/or present the content recommendations to the users 120 within the experiential range of the primary device 110, such as on the primary device 110.

The ad module 320 may have instructions stored thereon that, when executed by the processors 300, enable the HSG 140, to perform various functions related to requesting ads for rendering on the primary device 110. In example embodiments of the disclosure, the ads provided by the HSG 140 may be based at least in part on identified users 120 within the experiential range of the primary device 110. The processors 300 may be configured to generate an ad request and transmit the ad request to components of the content delivery system 200, such as the subscription servers 202. The ad request may include the identity of the users 120, such as a protected identity of the users 120, that may be within the experiential range of the primary device 110. In some alternate example embodiments, the ad request generated and/or transmitted by the processors 300 may not contain the identity, such as a protected identity, of the users 120 within the experiential range of the primary device, and instead, the users 120 within the experiential range of the primary device may be communicated by the processors 300, such as to the content delivery system 200, prior to transmitting the ad request. In some example embodiments, the processors 300 of the HSG 140 may be configured to generate the ad request when an ad avail or ad insertion time slot is relatively imminently available in the programming being displayed on the primary device 110. In other words, the processors 300 may be configured to generate an ad request at a predetermined time (e.g. 30 seconds, 60 seconds, etc.) before an ad avail in the programming content that is currently displayed by the HSG 140 on the primary device 110. The processors 300 may be configured to identify an upcoming and/or imminent ad avail in the rendered programming content based at least in part on a listing of ad avails of the rendered content. The processors 300 may be configured to receive this listing of ad avails from one or more components of the content delivery system 200, such as the playlist manager servers 206.

The processors 300 may further be configured to receive an ad, or an indication thereof, such as pointers to ad segments in a playlist or manifest file, responsive to the transmitted ad request. In example embodiments of the disclosure, the ad may be selected if it is or is relatively likely to be of interest to the users 120 within the experiential range of the primary device 110. In other words, the ad may be selected based on the preferences, historical behavior, and/or demographics, such as product or service preferences, of the users 120 within the experiential range of the primary device 110. In some cases, the ad may be selected if it is of interest to all of the users 120 within the experiential range of the primary device 110. In other cases, the ad may be based on a weighting of the preferences of the users 120 within the experiential range of the primary device 110. For example, the weighting may be towards a particular one of the users 120 among the users 120 within the experiential range of the primary device that may be relatively more likely to make purchasing decisions of products or services. In yet other cases, the ad may be based on the preferences of a subset of the users 120 within the experiential range of the primary device 110. In still other cases, where the ad listing indicates that there are multiple ad avails in the programming being rendered, each or at least a subset of the users 120 within the experiential range of the primary device 110 may be targeted in a sequential manner, such as in a round-robin type targeting scheme. The instructions stored in the ad module 320, when executed by the processors 300, may further enable the processors 300 to splice the received ads, such as the targeted ad, into the content that is being displayed on the primary device 110 by the HSG 140.

The secondary content module 322 may have instructions stored thereon that, when executed by the processors 300, enable the HSG 140, to perform various functions related to receiving and providing secondary content to user devices 130. In certain example embodiments, the processors 300 may be configured to receive one or more secondary content associated with an ad selection for insertion within the content rendered by the HSG 140 and the primary device 110. The HSG 140 may be configured to communicate the one or more secondary content to the one or more user devices 130, such as via the wireless communicative coupling therebetween. The secondary content may be, in some cases related to the ad that has been selected for rendering to the users 120 within the experiential zone of the primary device 110. In one example, the secondary content may be another ad associated with the product or service that is associated with the ad to be rendered on the primary device 110. In another example, the secondary content may be a link to a website associated with the product or service that is associated with the ad to be rendered on the primary device 110. In yet another example, the secondary content may be an interactive game associated with the product or service that is associated with the ad to be rendered on the primary device 110. In some case, different secondary content may be targeted for each of the users 120 in the experiential range of the primary device 110. In other cases, groups of or all of the users 120 in the experiential range of the primary device 110 may be targeted with the same secondary content.

It will be appreciated that there may be overlap in the functionality of the instructions stored in the operating systems (O/S) module 312, the applications module 314, the user identification module 316, the content recommendation module 318, the ad module 320, and the secondary content module 322. In fact, the functions of the aforementioned modules 312, 314, 316, 318, 320, 322 may interact and cooperate seamlessly under the framework of the HSG 140. Indeed, each of the functions described for any of the modules 312, 314, 316, 318, 320, 322 may be stored in any module 312, 314, 316, 318, 320, 322 in accordance with certain embodiments of the disclosure. Further, in certain embodiments, there may be one single module that includes the instructions, programs, and/or applications described within the operating systems (O/S) module 312, the applications module 314, the user identification module 316, the content recommendation module 318, the ad module 320, and the secondary content module 322.

Figure 4:
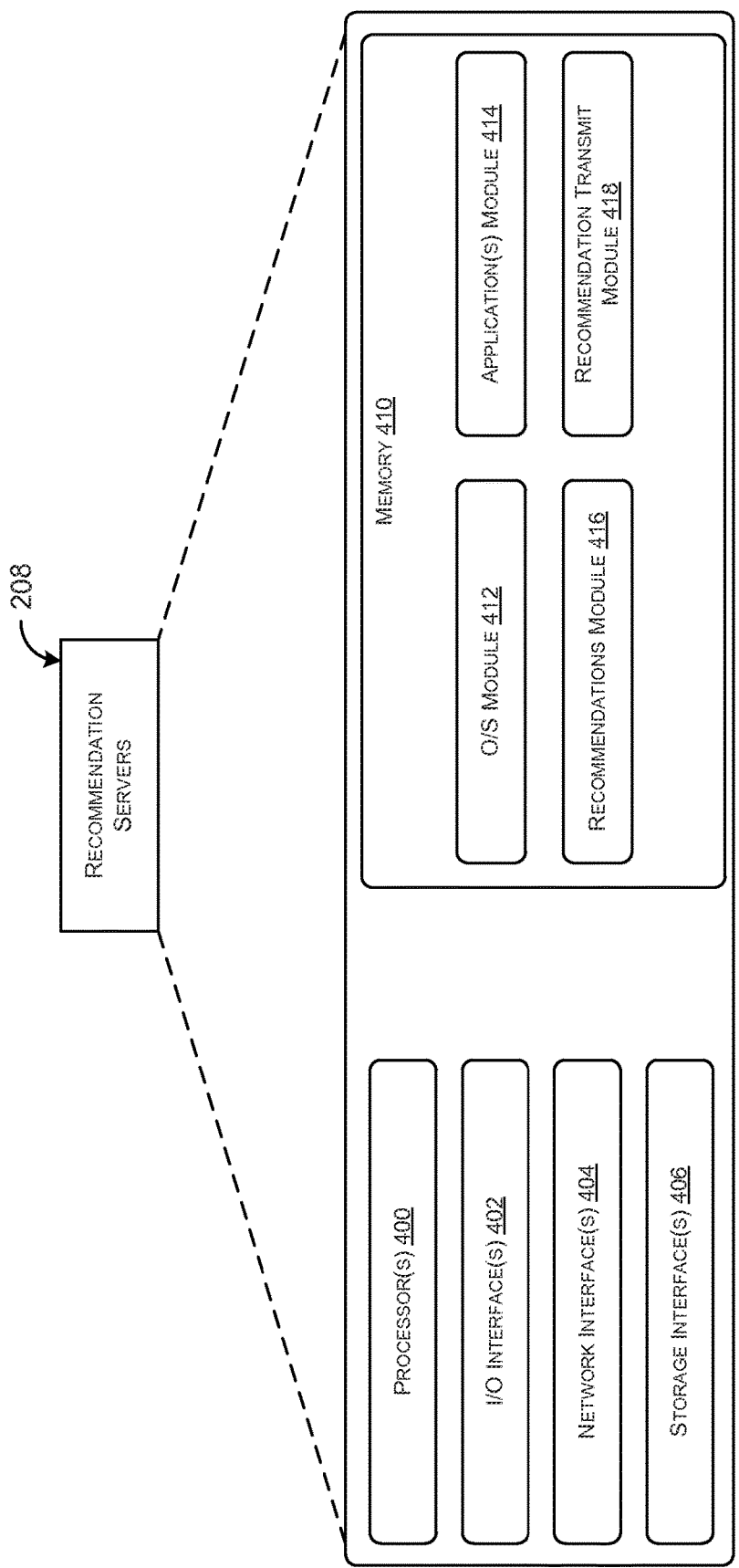
FIG. 4 is a simplified block diagram illustrating an example recommendation server, in accordance with example embodiments of the disclosure.

FIG. 4 is a simplified block diagram illustrating an example recommendation server 208, in accordance with example embodiments of the disclosure. The recommendation server 208 may include one or more processors 400, one or more input/output (I/O) interfaces 402, one or more network interfaces 404, one or more storage interfaces 406, and one or more memories 410. The descriptions of the one or more processors 400, one or more I/O interfaces 402, one or more network interfaces 404, and the one or more memories 410 may be substantially similar to the descriptions of the one or more processors 300, one or more I/O interfaces 302, one or more network interfaces 304, and the one or more memories 310, respectively, of the HSG 140, as described above, and therefore, in the interest of brevity, the description of these components will not be repeated here. The one or more storage interfaces 406 may enable the recommendation servers 208 to access one or more datastores, databases, and/or any other form of external storage or memory. In example embodiments of the disclosure, the one or more storage interfaces may enable the recommendation servers 208 to access, write to, and/or read from the user preference database 218.

The memory 410 may store program instructions that are loadable and executable on the processor(s) 400, as well as data generated or received during the execution of these programs. The memory 410 may have stored thereon software modules including an operating system (O/S) module 412, applications module 414, recommendations module 416, and recommendation transmit module 418. Each of the modules 412, 414, 416, 418 and/or software stored on the memory 410 may provide functionality for the recommendation server 208, when executed by the processors 400. The descriptions of the O/S module 412 and applications module 414 may be substantially similar to the descriptions of the O/S module 312 and applications module 314, respectively, of the HSG 140, as described above, and therefore, in the interest of brevity, the description of these components will not be repeated here.

The recommendations module 416 may have instructions stored therein that when executed by the processors 400 configure the recommendation servers 208 to provide a variety functionality associated with providing content recommendations based at least in part on the users 120 within the experiential range of the primary device 110. The processors 400 may be configured to receive a content recommendation request directly from the HSG 140 or via one or more intermediaries, such as the subscription servers 202. Upon receiving the content recommendation request, the recommendation servers 208 and the processors 400 thereon may be configured to determine the users 120 associated with the content recommendation. In other words, the recommendation servers 208 may be able to identify those users 120 that are within the experiential range of the primary device 110 for whom the content recommendation is to be provided. The users 120 associated with the content recommendation request may, in certain example embodiments, be ascertained by the content recommendation request received by the recommendation servers 208. In other example embodiments, the recommendation servers 208 and the processors 400 thereon may determine the user presence information associated with the content recommendation request by accessing the presence database 216 or requesting and/or receiving the presence information associated with the content recommendation request from the subscription servers 202.

Upon identifying the users 120 associated with the content recommendation request, the recommendation servers 208 and the processors 400 thereon may be configured to access a user preference database 218 that may store information associated with the preferences, demographics, and/or historical behavior of a variety of users 120. The demographical information associated with a particular user 120 may include, for example, number of people in the user's household, gender of the user, age of the user, race of the user, religion of the user, sexual orientation of the user, political views of the user, product or service preferences of the user, combinations thereof, or the like. The preference information associated with a particular user 120 may include, for example, what products or services the user likes or dislikes. The historical behavior information associated with a particular user 120 may include, for example, previous products or services purchased by the user, websites visited by the user, content requested by the user, ads that the user has viewed, ads with which the user has interacted, combinations thereof, or the like. The recommendation servers 208 and the processors 400 thereon may be configured to access the preference, demographic, and/or historical behavior information of all or at least some of the users 120 that are in the experiential range of the primary device 110 associated with the recommendation request. The processors 400 may further be configured to determine one or more content recommendations based at least in part on the preference, demographic, and/or historical behavior associated with one or more of the users 120 identified to be within the experiential range of the primary device 110. The processors 400 may further have access to a listing of a universe of content available to the users 120 within the experiential region of the primary device 110 from which recommendations are to be selected by the processors 400. Furthermore, the processors 400 may be able to identify, such as from a database, attributes of the available universe of content available to the users 120 within the experiential region of the primary device 110. The content recommendation may include one or more content that may be of interest to the users 120 within the experiential range of the primary device 110. In some cases, the content recommendations may be selected if they are of interest to all of the users 120 within the experiential range of the primary device 110. In other cases, the content recommendations may be based on a weighting of the preferences of the users 120 within the experiential range of the primary device 110. In yet other cases, the content recommendations may be based on the preferences of a subset of the users 120 within the experiential range of the primary device 110.

The recommendation transmit module 418 may have instructions stored therein that when executed by the processors 400 configure the recommendation servers 208 to direct transmitting the content recommendations based at least in part on the users 120 within the experiential range of the primary device 110. The recommendation servers 208 may be configured to provide the determined one or more content recommendations to the HSG 140 via one or more other entities, such as, for example, the playlist manager servers 206 and/or the subscription servers 202.

It will be appreciated that there may be overlap in the functionality of the instructions stored in the operating systems (O/S) module 412, the applications module 414, the recommendation module 416, and the recommendation transmit module 418. In fact, the functions of the aforementioned modules 412, 414, 416, 418 may interact and cooperate seamlessly under the framework of the recommendation server 208. Indeed, each of the functions described for any of the modules 412, 414, 416, 418 may be stored in any module 412, 414, 416, 418 in accordance with certain embodiments of the disclosure. Further, in certain embodiments, there may be one single module that includes the instructions, programs, and/or applications described within the operating systems (O/S) module 412, the applications module 414, the recommendation module 416, and the recommendation transmit module 418.

Figure 5:
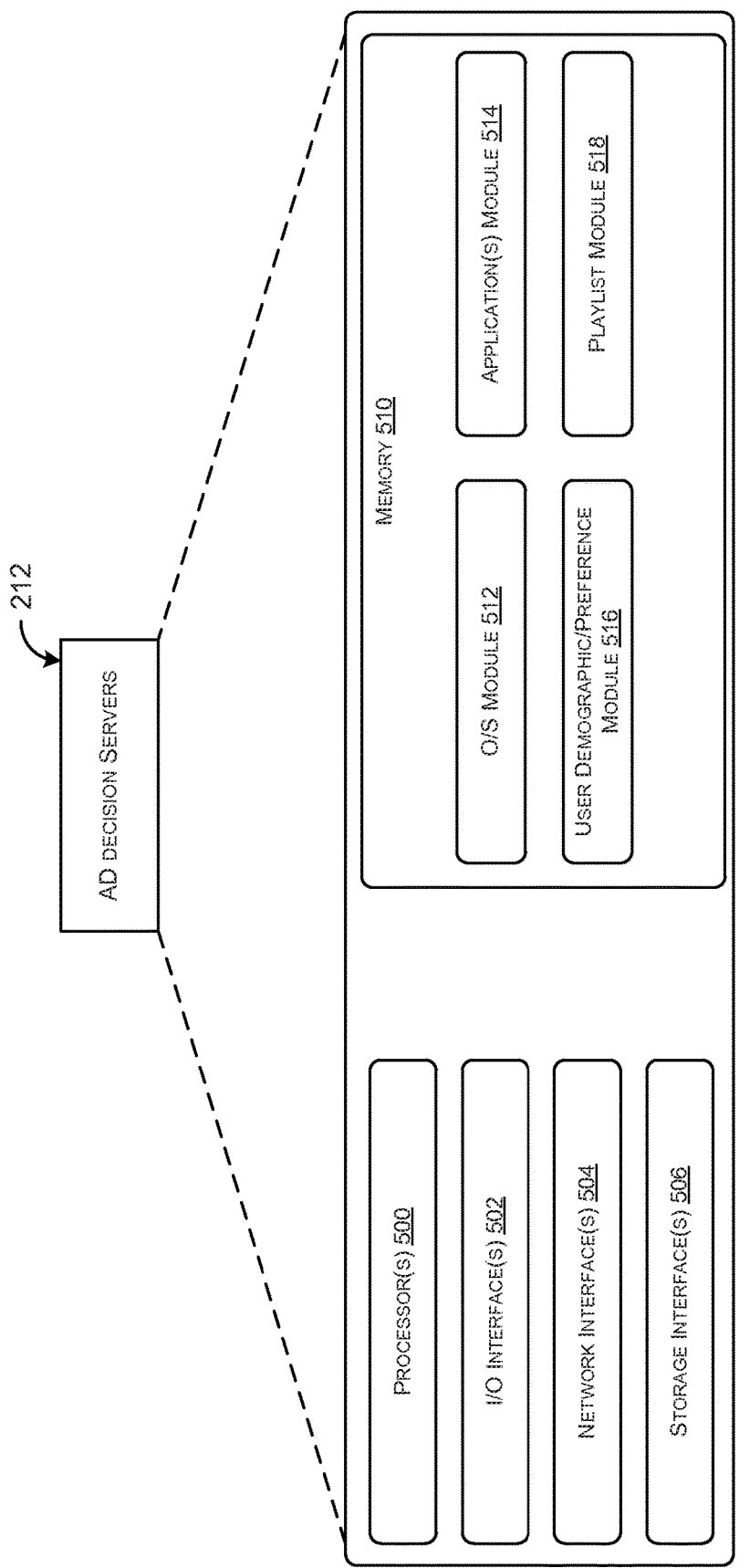
FIG. 5 is a simplified block diagram illustrating an example advertisement decision server, in accordance with example embodiments of the disclosure.

FIG. 5 is a simplified block diagram illustrating an example advertisement decision server 212, in accordance with example embodiments of the disclosure. The ad decision servers 212 may include one or more processors 500, one or more input/output (I/O) interfaces 502, one or more network interfaces 504, one or more storage interfaces 506, and one or more memories 510. The descriptions of the one or more processors 500, one or more I/O interfaces 502, one or more network interfaces 504, one or more storage interfaces 506, and the one or more memories 510 may be substantially similar to the descriptions of the one or more processors 400, one or more I/O interfaces 402, one or more network interfaces 404, one or more storage interfaces 406, and the one or more memories 410, respectively, of the recommendation servers 208 as described above, and therefore, in the interest of brevity, the description of these components will not be repeated here.

The memory 510 may store program instructions that are loadable and executable on the processor(s) 500, as well as data generated or received during the execution of these programs. The memory 510 may have stored thereon software modules including an operating system (O/S) module 512, applications module 514, user demographic/preference module 516, and playlist module 518. Each of the modules and/or software stored on the memory 510 may provide functionality for the ad decision servers 212, when executed by the processors 500. The descriptions of the O/S module 512 and applications module 514 may be substantially similar to the descriptions of the O/S module 312 and applications module 314, respectively, of the HSG 140, as described above, and therefore, in the interest of brevity, the description of these components will not be repeated here.

The demographic/preference module 516 may have instructions stored therein that when executed by the processors 500 configure the ad decision servers 212 to provide a variety functionality associated with providing content recommendations based at least in part on the users 120 within the experiential range of the primary device 110. The ad decision servers 212 may, in certain example embodiments, receive either the ad request generated by the HSG 140 or a different and/or derivative ad request from the ad decision manager servers 210 or the subscription servers 202. The ad decision servers 212 and the processors 500 thereon may further be configured, in accordance with example embodiments of the disclosure, to identify the users 120 that are within the experiential range of the primary device 110 based at least in part on the received ad request. The ad decision servers 212 and the processors 500 thereon may be configured to access the user preference database 218 to retrieve information associated with the preferences, demographics, and/or historical behavior of one or more of the users 120 within the experiential zone of the primary device 110, as indicated in the received ad request. The processors 500 may still further be configured to receive information pertaining to ad campaigns that are being run and/or ads that are available for providing and/or rendering to users 120. The ad campaign and/or available ad information may be retrieved and/or received from the ad campaign servers 214. Based at least in part on the preferences, demographics, and/or historical behavior of one or more of the users 120 within the experiential zone of the primary device 110, the processors 500 may be configured to select an ad to be rendered on the primary device 110 to the users 120 within the experiential region of the primary device 110. The ad decision servers 212 and the processors 500 thereon, in some further example embodiments, may be enabled to select one or more secondary content to be displayed to the users 120 within the experiential region of the primary device 110 on their respective user devices 130, in addition to the selected ad to be rendered on the primary device 110.

The playlist module 518 may have instructions stored therein that when executed by the processors 500 configure the ad decision servers 212 to direct transmitting the content recommendations based at least in part on the users 120 within the experiential range of the primary device 110. The selected ad, and, optionally the one or more second content, or indications thereof, may be communicated by the ad decision servers 212 and the processors 500 thereon to the playlist manager servers 206 to be incorporated into updated playlists to be transmitted to the HSG 140 to enable the HSG 140 to receive the selected ad and/or one or more second content, such as from the content servers 204.

It will be appreciated that there may be overlap in the functionality of the instructions stored in the operating systems (O/S) module 512, the applications module 514, the user demographic/preference module 516, and the playlist module 518. In fact, the functions of the aforementioned modules 512, 514, 516, 518 may interact and cooperate seamlessly under the framework of the ad decision servers 212. Indeed, each of the functions described for any of the modules 512, 514, 516, 518 may be stored in any module 512, 514, 516, 518 in accordance with certain embodiments of the disclosure. Further, in certain embodiments, there may be one single module that includes the instructions, programs, and/or applications described within the operating systems (O/S) module 512, the applications module 514, the user demographic/preference module 516, and the playlist module 518.

Figure 6:
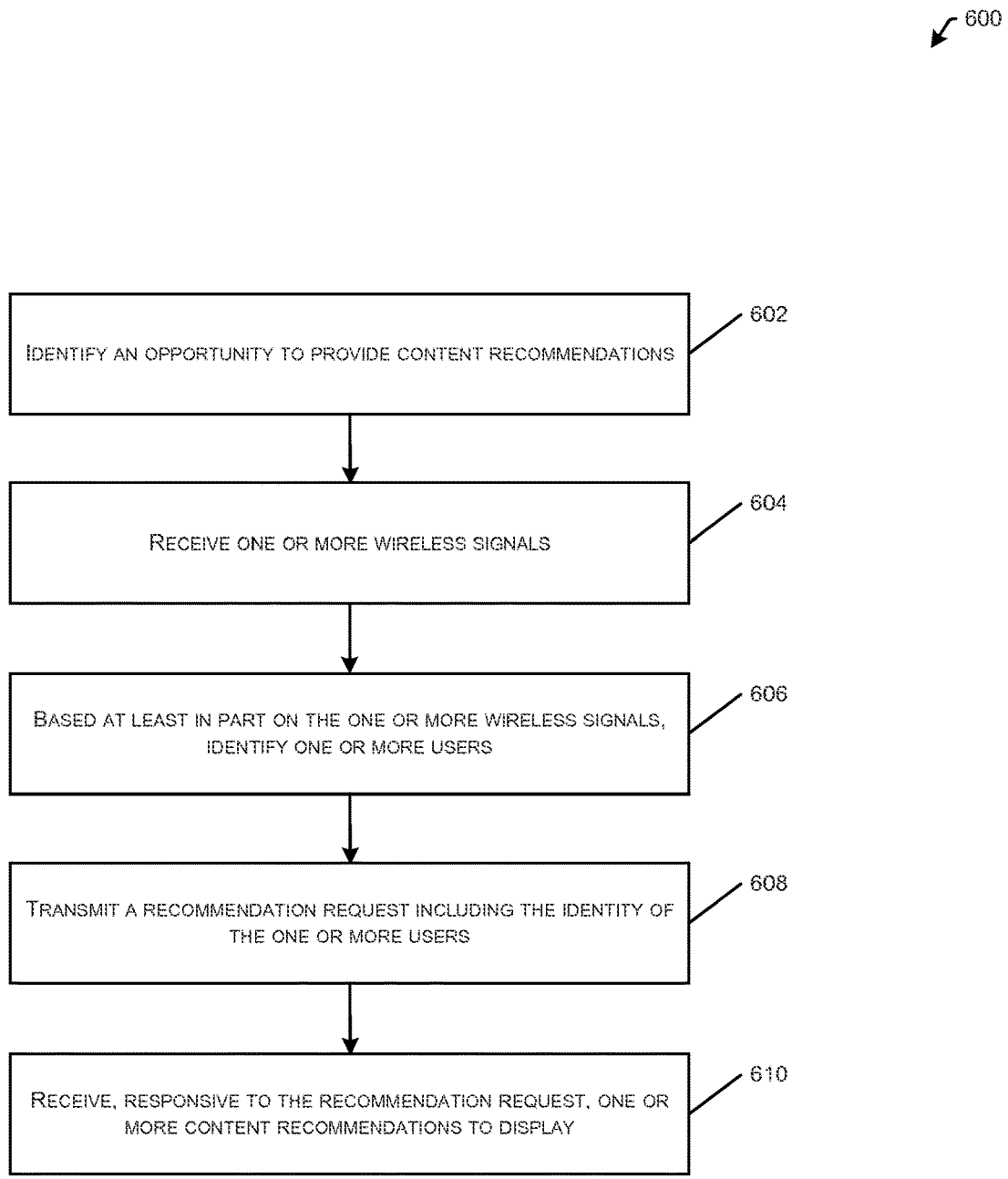
FIG. 6 is a flow diagram illustrating an example method for receiving one or more content recommendations based at least in part on the presence of users in relative proximity of where content is to be rendered, in accordance with certain example embodiments of the disclosure.

FIG. 6 is a flow diagram illustrating an example method 600 for receiving one or more content recommendations based at least in part on the presence of users in relative proximity of where content is to be rendered, in accordance with certain example embodiments of the disclosure. In certain example embodiments, the method 600 may be performed by the HSG 140 and the processors 300 thereon. The HSG 140, in performing the method 600, may interact with the subscription servers 202 or other entities 204, 206, 208, 210, 212, 214 of the content delivery system 200 during one or more processes of method 600.

At block 602, an opportunity to provide recommendations may be identified. This opportunity may present itself and may be identified in a periodic fashion (e.g. every half-hour, every hour, etc.) Alternatively, this opportunity may be recognized at the end of or a relatively imminent end of the current content being rendered by the HSG 140 on the primary display 110. Further still, the opportunity to provide content recommendations may be recognized by the HSG 140 if one or more of the users are "channel-surfing" or are otherwise indicating that they are searching for content to view.

At block 604, one or more wireless signals may be received. The wireless signals may be received from the user devices 130 in any variety or combinations of protocols including, for example BLE. The wireless signals may be received via the antenna 142 and/or the radio 306. The wireless signal may carry a variety of information thereon, including an identity of the user device 130 transmitting the wireless signal.

At block 606, one or more users may be identified based at least in part on one or more wireless signals. The wireless signals may be analyzed to determine which user devices 130 transmitted the received wireless signals. This may include various signal processing processes on the received wireless signals, including, for example, demodulation of the received wireless signals.

At block 608, a recommendation request including the protected identity of the one or more users may be transmitted. The recommendation request may be generated as one or more data packets and may be transmitted to the content delivery system 200, such as to the subscription servers 202 or the recommendation servers 208 via one or more suitable communications networks.

At block 610, one or more content recommendations to display may be received responsive to the recommendation request. The content recommendations may be targeted to some or all of the users 120 within the experiential range of the primary device 110. In certain embodiments, the content recommendations may be targeted to those users 120 within the experiential range of the primary device 110 for whom preference, behavior, and/or demographic information is available.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
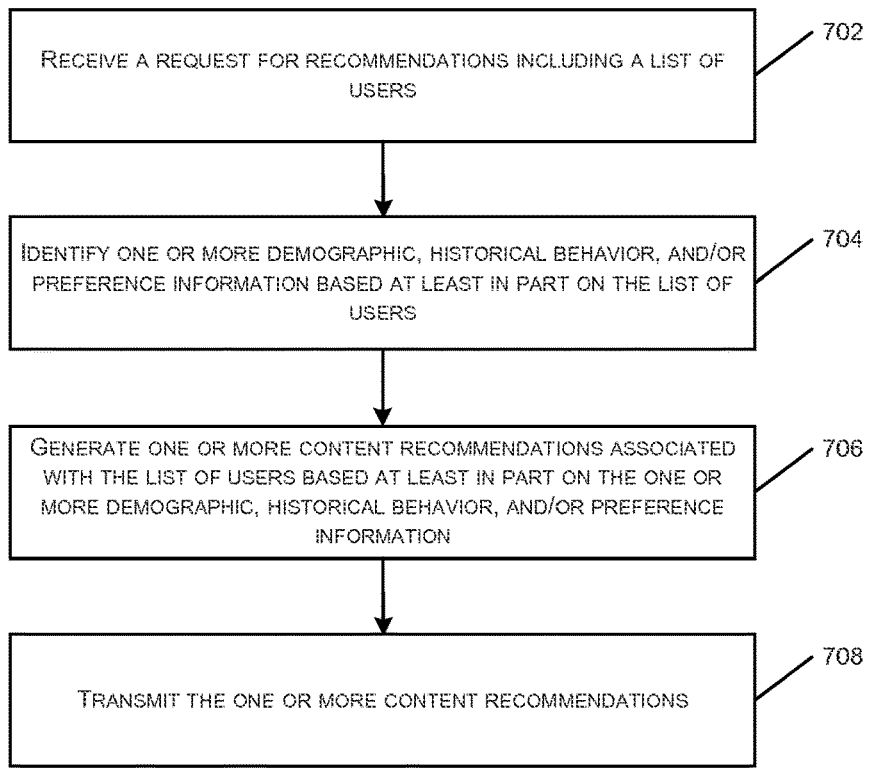
FIG. 7 is a flow diagram illustrating an example method for transmitting one or more content recommendations, in accordance with certain example embodiments of the disclosure.

FIG. 7 is a flow diagram illustrating an example method 700 for transmitting one or more content recommendations, in accordance with certain example embodiments of the disclosure. This method 700 may be performed by the recommendation servers 208 and the processors 400 thereon in cooperation with one or more other components of the content delivery system 200. At block 702, a request for recommendations including a list of users may be received. This request may be received directly from the HSG 140 or through an intermediary element, such as the subscription servers 202.

At block 704, one or more demographic, historical behavior, and/or preference information may be identified based at least in part on the list of users. The demographic, historical behavior, and/or preference information may be accessed from a database, such as the user preference database 218.

At block 706, one or more content recommendations associated with the list of users may be generated based at least in part on the one or more demographic and/or preference information. The recommendations may be based at least in part on the universe of content that may be available to the users within the experiential range of the primary device 1, along with the attributes of the available content and user demographic, historical behavior, and/or preference information. In certain example embodiments, the user demographic, historical behavior, and/or preference information may be matched to attributes of the available content. As a non-limiting example, if the user demographic, historical behavior, and/or preference information of the users 120 within the experiential range of the primary device 110 indicate that the users 120 like horror movies, then content from the available content that are horror movies may be selected as recommendations. As another non-limiting example, if the user demographic, historical behavior, and/or preference information of the users 120 within the experiential range of the primary device 110 indicate that there are children present, then the content recommendations selected may be those that include children's programming.

At block 708, the one or more content recommendations may be transmitted. The content recommendation may be directly transmitted to the HSG 140 or via one or more other elements, such as the playlist manager servers 206 or the subscription servers 202.

It will be appreciated that while a single HSG 140 is depicted, the content delivery system 200 may provide content delivery services to multiple households and/or businesses, each with one or more HSGs 140. Therefore, the recommendation servers 208 may be providing content recommendations to multiple HSGs 140 and may be receiving content recommendation requests from a plurality of HSGs 140.

It should be noted, that the method 700 may be modified in various ways in accordance with certain embodiments of the disclosure. For example, one or more operations of method 700 may be eliminated or executed out of order in other embodiments of the disclosure. Additionally, other operations may be added to method 700 in accordance with other embodiments of the disclosure.

Figure 8:
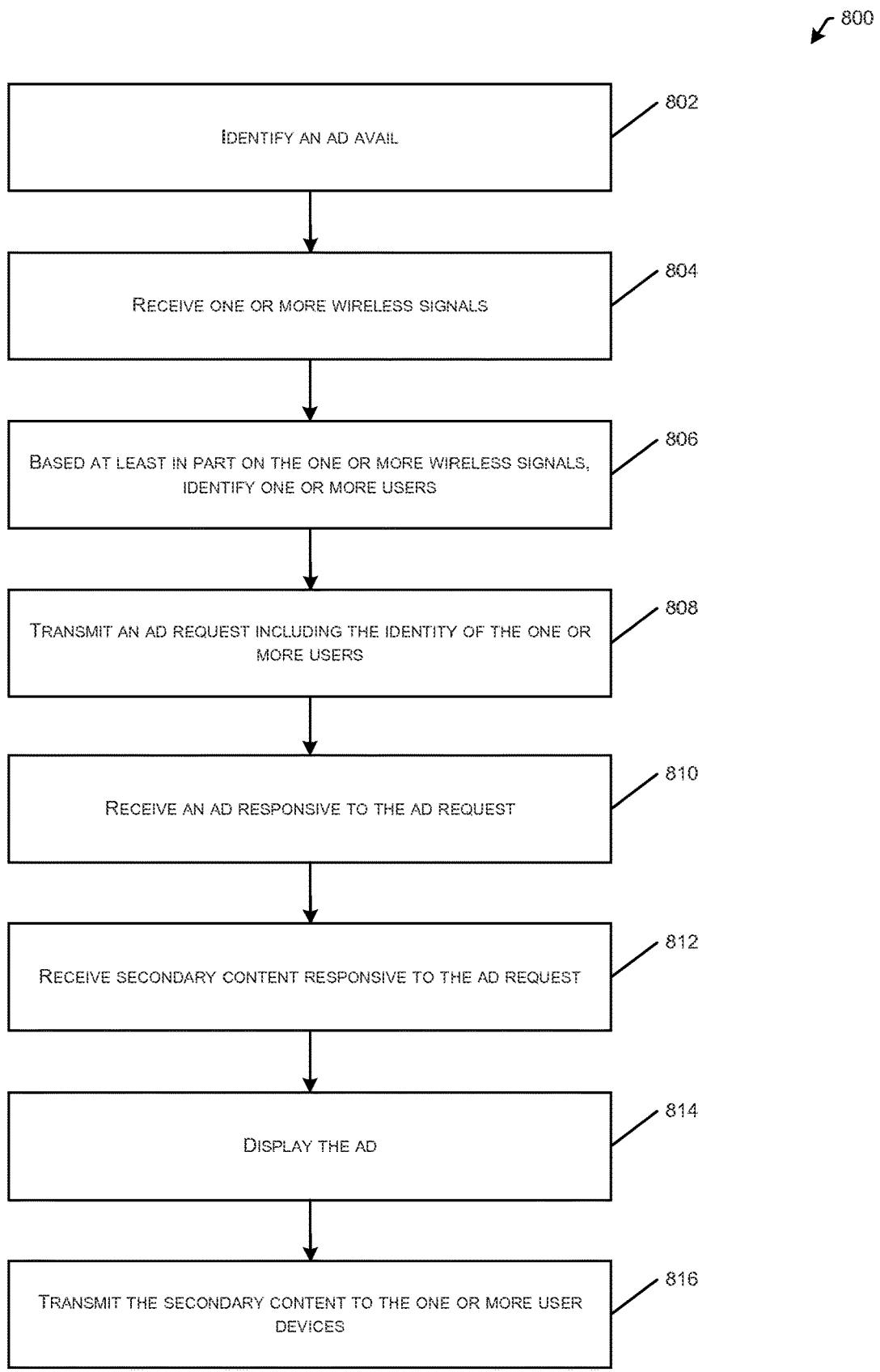
FIG. 8 is a flow diagram illustrating an example method for receiving and displaying an ad based at least in part on the presence of users in relative proximity of where content is to be rendered, in accordance with certain example embodiments of the disclosure.
Figure 9:
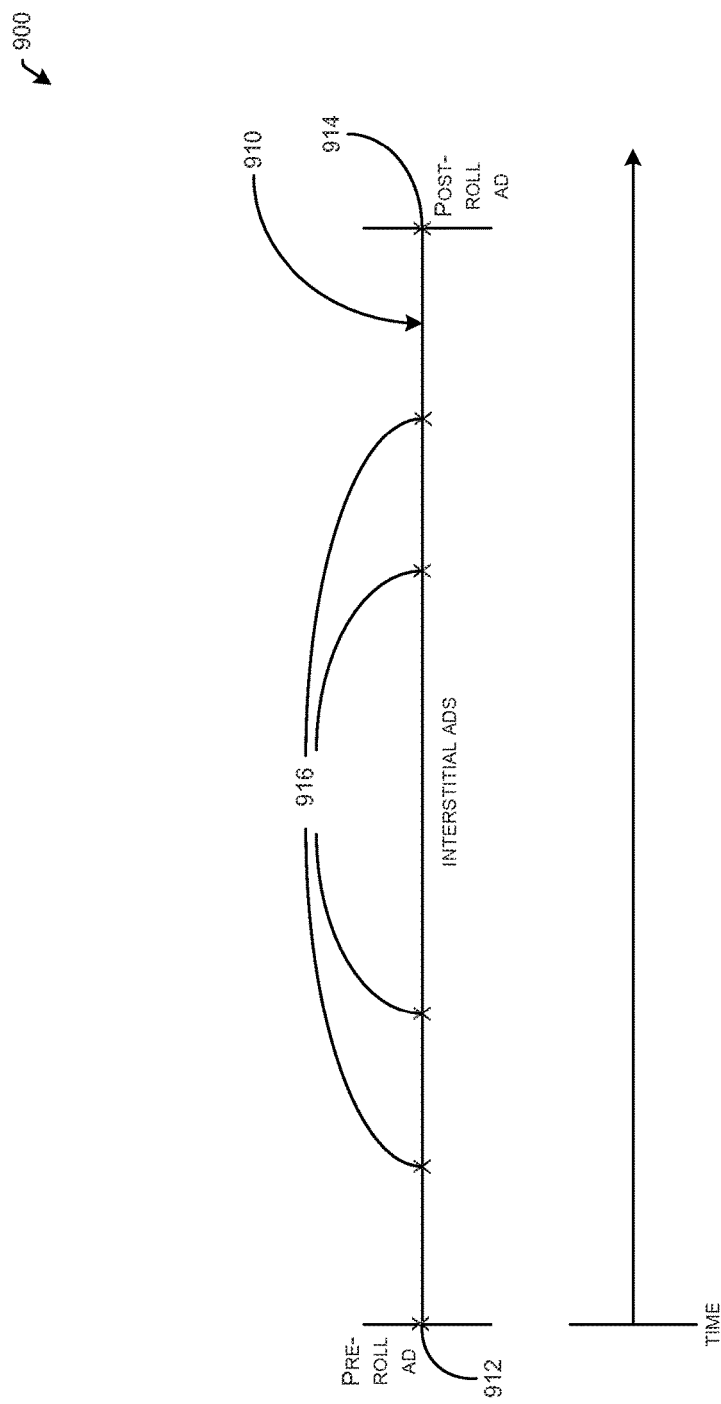
FIG. 9 is a graphical depiction illustrating a listing of ad avails associated with a particular content, in accordance with certain example embodiments of the disclosure.

FIG. 8 is a flow diagram illustrating an example method 800 for receiving and displaying an ad based at least in part on the presence of users in relative proximity of where content is to be rendered, in accordance with certain example embodiments of the disclosure. At block 802, an ad avail may be identified. The ad avail may be determined based at least in part on an ad listing associated with the content. The ad listing may be understood with reference to FIG. 9. FIG. 9 is a an illustration of an ad listing 900 of a particular content, in accordance with certain example embodiments of the disclosure. The ad listing 900 may represent the run time of the content 910 and the placement and/or time slots of ads 912, 914, 916 within that run time. The ad avails may include pre-roll ads 912, post-roll ads 914, and interstitial ads 916. Therefore, based on the ad listing 900, the HSG 140 or any other entity, such as the ad decision servers 212 or ad decision manager servers 210, may have information related to the number and/or insertion points of ads that may be rendered during the rendering of the content being experienced by the users 120 within the experiential range of the user device 110. This information may be used to sequentially target ads to users 120 within the experiential range of the primary device 110. In some example embodiments, the ad listing information may be used along with an ad map that provided information associated with the duration and/or permissible range of duration of the ads to be inserted in each of the ad avail slots as determined from the ad listing 900.

At block 804, one or more wireless signals may be received. The description of this process may be similar to the description of the process of block 604 of FIG. 6, and in the interest of brevity, the description will not be repeated here. At block 806, one or more users may be identified based at least in part on the one or more wireless signals. The description of this process may be similar to the description of the process of block 06 of FIG. 6, and in the interest of brevity, the description will not be repeated here.

At block 808, an ad request including the identity of the one or more users may be transmitted. The ad request may be generated as one or more data packets and may be transmitted to the content delivery system 200, such as to the subscription servers 202 or the recommendation servers 208 via one or more suitable communications networks.

At block 810, an ad, or an indication thereof, may be received responsive to the ad request. In example embodiments, reference to the ad, rather than the ad itself, may be received. This reference may be an identifier of the ad and/or an address or link on the content delivery system 200 from where the ad may be received and/or retrieved by the HSG 140. In some example embodiments, a provider identification (PID) and/or a provider asset identification (PAID) associated with the targeted ad may be received by the HSG 140. In further example embodiments, an indication or link (e.g. universal resource locator (URL)) associated with the selected and/or targeted ad (i.e. ad selected by the ad decision servers 212) may be received, such as in the form of an updated playlist from the playlist manager severs 206. This updated playlist, or manifest file, may include pointers to segments of the targeted ad that may be found on the content delivery system 200, such as at the content servers 204. In these example embodiments, the HSG 140 may retrieve and/or receive the selected and/or targeted ad from the content servers 204.

At block 812, secondary content, or an indication thereof, may be received responsive to the ad request. In some example embodiments, secondary content may be provided along with the ad to be rendered on the primary device 110. As in the case of the ad, a reference to the secondary content, rather than the secondary content itself, may be received. This reference may be an identifier of the secondary content and/or an address or link on the content delivery system 200 from where the secondary content may be received and/or retrieved by the HSG 140. The secondary content may, in some cases, be related to the ad that has been selected for rendering to the users 120 within the experiential zone of the primary device 110. In one example, the secondary content may be another ad associated with the product or service that is associated with the ad to be rendered on the primary device 110. In another example, the secondary content may be a link to a website associated with the product or service that is associated with the ad to be rendered on the primary device 110. In yet another example, the secondary content may be an interactive game associated with the product or service that is associated with the ad to be rendered on the primary device 110. In some cases, different secondary content may be targeted for each of the users 120 in the experiential range of the primary device 110. In other cases, groups of or all of the users 120 in the experiential range of the primary device 110 may be targeted with the same secondary content.

At block 814, the ad may be displayed. The selected ad may be inserted into the ad avail slot of the content being rendered on the primary device 110. In other words, the HSG 140 may provide one or more signals to the primary device 110, similar to rendering content on the primary device 110, to render the selected ad on the primary device 110. At block 816, the secondary content may be transmitted to the one or more user devices. The one or more secondary content may be communicated to the one or more user devices 130 via the wireless communicative coupling therebetween. In some cases, such as cases where the same secondary content is to be provided to all of the user devices 130 within radio range, the secondary content may be broadcast to the user devices 130 by the HSG 140. In other cases, different secondary content may be directed to individual user devices 130.

It will further be appreciated that the HSG 140 may optionally collect interaction metrics associated with the ad and/or the one or more secondary content. For example, the HSG 140 may report back the number of actual and/or estimated users 120 that viewed the selected ad on the primary device 110. As another example, the HSG may receive an indication of any user interaction with the secondary content provided to the user devices 130, such as from applications being executed on the user devices 130. The metrics, such ad views, interactions, click-throughs, or the like, may be reported by the HSG 140 to the content delivery system 200, such as to the ad decision servers 212 and/or ad decision manager servers 210.

It should be noted, that the method 800 may be modified in various ways in accordance with certain embodiments of the disclosure. For example, one or more operations of method 800 may be eliminated or executed out of order in other embodiments of the disclosure. Additionally, other operations may be added to method 800 in accordance with other embodiments of the disclosure.

Figure 10:
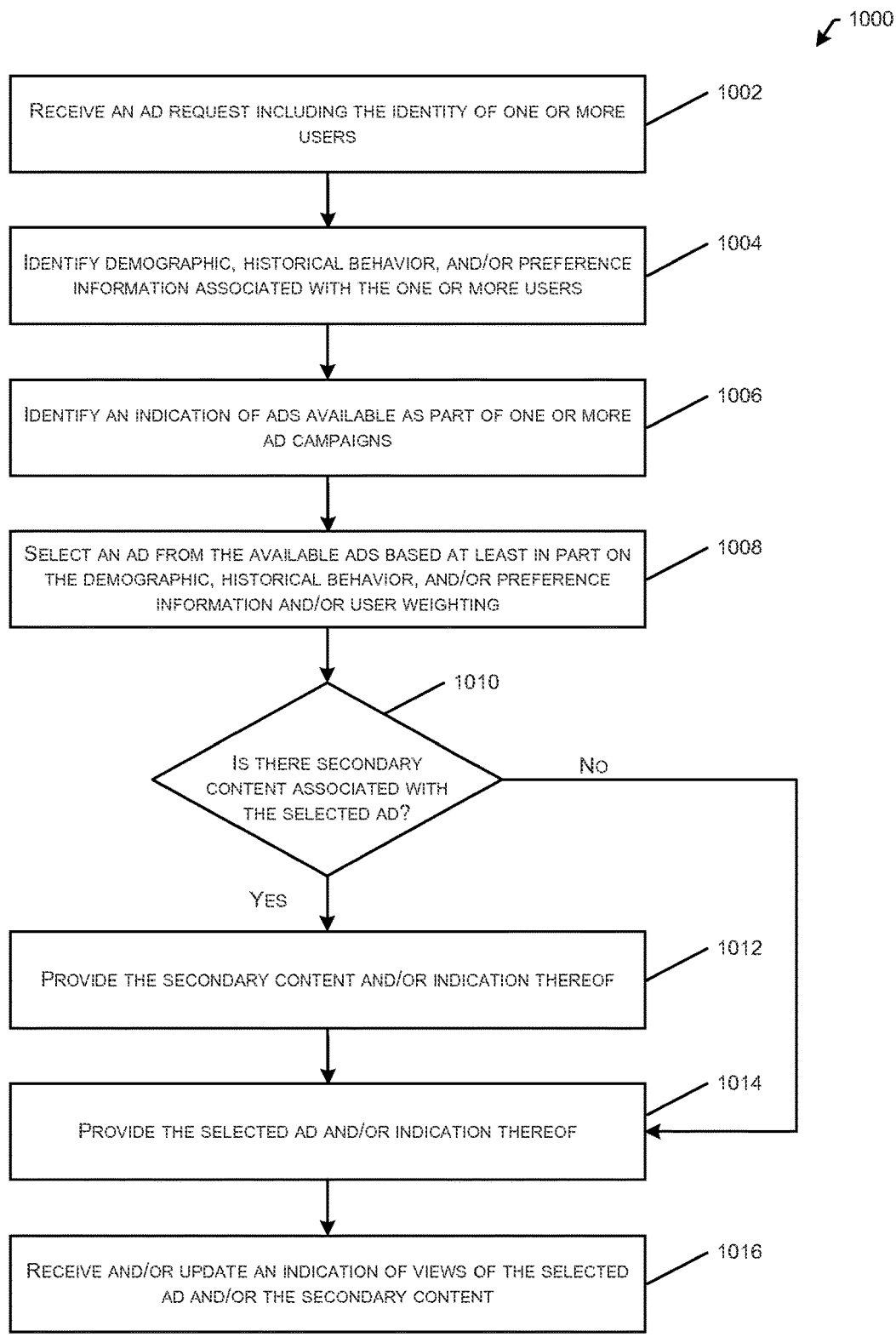
FIG. 10 is a flow diagram illustrating an example method for providing an advertisement based at least in part on the presence of users and collecting advertising metrics associated with rendering of the advertisement, in accordance with certain example embodiments of the disclosure.

FIG. 10 is a flow diagram illustrating an example method 1000 for providing an advertisement based at least in part on the presence of users and collecting advertising metrics associated with rendering of the advertisement, in accordance with certain example embodiments of the disclosure. The method 1000 may be performed by the ad decision servers 212 in cooperation with one or more entities, such as the ad decision manager servers 210, the subscription servers 202, ad campaign servers 214, and/or the HSG 140.

At block 1002, an ad request including the identity of one or more users may be received. This ad request may be sent from the HSG 140 when the HSG 140 determines, such as based upon an ad listing 900 of the content, that an ad avail is relatively imminent. Alternatively, the ad request received by the ad decision servers 212 may be one that is generated by the ad decision manger servers 210 based on identifying an upcoming ad avail in content being viewed by users 120 within the experiential range of the primary device 110.

At block 1004, demographic, historical behavior, and/or preference information associated with the one or more users may be identified. The description this process may be similar to the description of the process of 704 of method 700 of FIG. 7, and in the interest of brevity, will not be repeated here.

At block 1006, an indication of ads available as part one or more ad campaigns may be identified. The ads that are available may be identified by communicating with the ad campaign severs 214. In some example embodiments, the ad decision servers 212 may solicit the ad campaign servers 214 for information related to ads from which a selection may be made for presentation to the users 120 within the experiential range of the primary device 110. In some further cases, the ad decision servers 212 may receive information of ads that may be preferred for presentation to users 120, such as for example ads that are not on target (i.e. behind target) in terms of metrics to be delivered to an advertiser associated with those ads. The ad decision servers 212, within the context of targeting ads based at least in part on the users 120 within the experiential range of the primary device 110, may, in certain example embodiments, are below target metrics negotiated and/or contracted with the advertiser(s). These below-target ads may be identified during the processes of block 1006.

At block 1008, an ad from the available ads may be selected based at least in part on the demographic, historical behavior, and/or preference information and/or user weighting. In this case, an ad may be selected that targets the interests of the users 120 within the experiential range of the primary device 110. In some cases, a particular user 120 among all the users 120 within the experiential range of the primary device 110 may be targeted. For example, a user 120 that relatively more responsible for making purchasing decisions may be targeted among all of the users 120 within the experiential range of the primary device 110. In other examples, different ads during the rendering of a particular content may be targeted to different users 120. For example, the pre-roll ad 912 may be targeted to the user 120(1), an interstitial ad 916 may be targeted to user 120(2), and the post-roll ad 914 may be targeted to user 120(N). In other examples, ads may be targeted to each of the users 120 within the experiential range of the primary device 120, however, one or more users 120 may be targeted more than the other users 120. For example, in a household situation, the mother and father (i.e. those with discretionary spending power) may be targeted more heavily than children (i.e. those without substantial discretionary spending power).

In example embodiments, the ad selected may be based on previous purchases by one or more of the users 120 within the experiential range of the primary device 110. In a non-limiting example, it may be known that a particular user 120 owns a particular videogame console, and accordingly, ads associated with video games for that console may be directed to that user 120 when he/she is within the experiential range of the primary device 110. In another non-limiting example, demographic information, such as income level may be identified for a particular user 120 and, based thereon, ads products or services consumed by people in that income level may be targeted to that user 120 when he/she is within the experiential range of the primary device 110. In yet another non-limiting example, it may be determined that a particular user 120 interacted with a particular ad of a product or service in the past, but had not purchased that product or service. In that case, a new ad for that product or service may be targeted for that user 120 when he/she is within the experiential range of the primary device 110. In still another non-limiting example, it may be identified that a particular user 120, who is the mother/wife of her household with children makes substantial purchasing decisions for that household, ads for household goods may be targeted to that user 120.

At block 1010, it may be determined if there are secondary content associated with the selected ad. This information may also be received from the ad campaign servers 214. If at block 1010 it is determined that there is secondary content associated with the selected ad, then at block 1012, the secondary content and/or an indication thereof may be provided. The one or more secondary content may be provided directly to the HSG 140 or may be transmitted indirectly via the playlist manager servers 206 or other entities of the content delivery system 200. In some example embodiments, a pointer to the one or more secondary content, from where the one or more secondary content may be retrieved, may be provided to the HSG 140. Upon providing the secondary content, the method 1000 may continue with the processes of block 1014. If, however, at block 1010 it is determined that there is no secondary content associated with the selected ad, then the method 1000 may proceed to block 1014, where the selected ad and/or the indication thereof may be provided.

At block 1016, an indication of metrics associated with the selected ad and/or the secondary content may be received and/or updated. In some cases, a database of the metrics may be updated with these metrics information. The metrics information, in some example embodiments, may be provided to the ad campaign servers 214 for storage and updating of ad campaigns. The metric information may be received from the HSG 140 and/or other intermediary entities, such as the subscription servers 202.

It will be appreciated that while a single HSG 140 is depicted, the content delivery system 200 may provide content delivery services to multiple households and/or businesses, each with one or more HSGs 140. Therefore, the ad decision servers 212 may be providing ads, or indications thereto, to multiple HSGs 140 and may be receiving ad requests from a plurality of HSGs 140.

It should be noted, that the method 1000 may be modified in various ways in accordance with certain embodiments of the disclosure. For example, one or more operations of method 1000 may be eliminated or executed out of order in other embodiments of the disclosure. Additionally, other operations may be added to method 1000 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:
   receiving, by a home service gateway associated with a primary device and comprising one or more processors, wireless signals from one or more user transmitting devices;
   determining, by the home service gateway and based at least in part on the wireless signals, one or more user accounts associated with the one or more user transmitting devices, a first user account of the one or more user accounts being associated with an identity, wherein the identity of the first user account includes at least one of: user preferences, user demographics, and user historical behavior;
   determining, based on the wireless signals, that at least some of the one or more user transmitting devices are in an experiential range of the primary device;
   identifying, by the home service gateway, an advertisement (ad) avail for the primary device, wherein the ad avail comprises a slot where an ad is inserted into content on the primary device;
   generating, by the home service gateway, based at least in part on identifying the ad avail and the determination that the one or more user transmitting devices are in an experiential range of the primary device, an ad request, the ad request including the identity of the first user account;
   transmitting, by the home service gateway, the ad request;
   receiving, by the home service gateway and responsive to the ad request, a playlist associated with an ad based at least in part on the identity included in the ad request; and
   providing, by the home service gateway, audio or video signals associated with the ad to the primary device, wherein the audio or video signals are configured to cause the primary device to render the ad.

2. The method of claim 1, further comprising receiving, by the home service gateway, the ad based at least in part on the playlist.

3. The method of claim 1, further comprising:
   receiving, by the home service gateway, a secondary content associated with the ad; and
   wirelessly transmitting, by the home service gateway, the secondary content to the one or more user transmitting devices.

4. The method of claim 3, wherein the secondary content comprises at least one of: (i) a second ad associated with a product or service associated with the ad; (ii) an image associated with the ad; (iii) a sound associated with the ad; (iv) a hyperlink associated with the ad; or (v) an interactive game associated with the ad.

5. The method of claim 1, wherein the wireless signals comprise Bluetooth Low Energy signals.

6. A home service gateway, comprising:
   an antenna configured to receive wireless signals from one or more user transmitting devices;
   one or more memories that store computer-executable instructions; and
   at least one processors configured to access the one or more memories, wherein the at least one processor is further configured to execute the computer-executable instructions to:
   receive wireless signals from one or more user transmitting devices;
   determine, based at least in part on the wireless signals, one or more user accounts associated with the one or more user transmitting devices, each of the one or more user accounts being associated with an identity, wherein the identity of each of the one or more user accounts includes at least one of user preferences, user demographics, and user historical behavior;
   determine, based on the wireless signals, that at least some of the one or more user transmitting devices are in an experiential range of the primary device;
   identify an advertisement (ad) avail for the primary device, wherein the ad avail comprises a slot where an ad is inserted into content on the primary device;
   generate, based at least in part on identifying the ad avail and the determination that the one or more user transmitting devices are in an experiential range of the primary device, an ad request, the ad request including at least some of the identities included in the ad request;
   transmit the ad request;
   receive, responsive to the ad request, a playlist associated with an ad based at least in part on the identities includes in the ad request; and
   provide audio or video signals associated with the ad to the primary device, wherein the audio or video signals are configured to cause the primary device to render the ad.

7. The home service gateway of claim 6, wherein the at least one processor is further configured to execute the computer-executable instructions to receive the ad based at least in part on the playlist.

8. The home service gateway of claim 6, wherein the at least one processor is further configured to execute the computer-executable instructions to:

receive a secondary content associated with the ad; and wirelessly transmit the secondary content to the user transmitting devices.

9. The home service gateway of claim 8, wherein the secondary content comprises at least one of: (i) a second ad associated with a product or service associated with the ad; (ii) an image associated with the ad; (iii) a sound associated with the ad; (iv) a hyperlink associated with the ad; or (v) an interactive game associated with the ad.

10. The home service gateway of claim 6, wherein the at least one processor is further configured to execute the computer-executable instructions to identify one or more metrics associated with the ad and transmitting an indication of the one or more metrics.

11. A method, comprising:
receiving, by an ad decision server, one or more wireless signals, wherein the one or more wireless signals are associated with one or more user transmitting devices;
determining, by the ad decision server and based on the one or more wireless signals, one or more user accounts associated with the one or more user transmitting devices, the one or more user accounts each being associated with an identity, wherein the identity of each of the one or more user accounts includes at least one of: user preferences, user demographics, and user historical behavior;
receiving, by an ad (advertisement) decision server comprising one or more processors, an ad request, wherein the ad request includes at least one of the identities of each of the one or more user accounts, and wherein the ad request is associated with an ad avail for the primary device, wherein the ad avail comprises a slot where an ad is inserted into content on a primary device;
determining, based on the wireless signals, that at least some of the one or more user transmitting devices are in an experiential range of the primary device;
identifying, by the ad decision server, a plurality of ads available for rendering in the ad avail of the primary device based at least in part on the determination that at least some of the one or more user transmitting devices are in an experiential range of the primary device;
selecting, by the ad decision server, an ad from the plurality of ads based at least in part on the identities associated with the one or more user accounts of the at least some of the one or more user transmitting devices in experiential range of the primary device;
transmitting, by the ad decision server, an identifier of the selected ad; and
receiving, by the primary device, audio or video signals associated with the ad, wherein the audio or video signals are configured to cause the primary device to render the ad to the user in the ad avail.

12. The method of claim 11, wherein determining the identity of each of the one or more user accounts comprises accessing a user preference database containing the user preferences, user demographics, and user historical behavior associated with the at least one user.

13. An advertisement (ad) decision server, comprising:
one or more memories that store computer-executable instructions; and
a one or more processors configured to access the one or more memories, wherein at least one of the one or more processors is further configured to execute the computer-executable instructions to:
receive one or more wireless signals including first information, wherein the one or more wireless signals are associated with one or more user transmitting devices;
determine, by the ad decision server and based on the one or more wireless signals, one or more user accounts associated with the one or more user transmitting devices, the one or more user accounts each being associated with an identity, wherein the identity of each of the one or more user accounts includes at least one of: user preferences, user demographics, and user historical behavior;
receive an ad request, wherein the ad request includes at least one of the identities of each of the one or more user accounts, and wherein the ad request is associated with an ad avail for the primary device, wherein the ad avail comprises a slot where an ad is inserted into content on a primary device;
determine, based on the wireless signals, that the one or more user transmitting devices are in an experiential range of the primary device;
identify a plurality of ads available for rendering in the ad avail of the primary device based at least in part on the determination that at least some of the one or more user transmitting devices are in an experiential range of the primary device;
select, by the ad decision server, an ad from the plurality of ads based at least in part on the identities associated with the one or more user accounts of the at least some of the one or more user transmitting devices in experiential range of the primary device;
transmit an identifier of the selected ad; and
receive, by the primary device, audio or video signals associated with the ad, wherein the audio or video signals are configured to cause the primary device to render the ad to the user on the ad avail.

* * * * *